Patented May 9, 1933

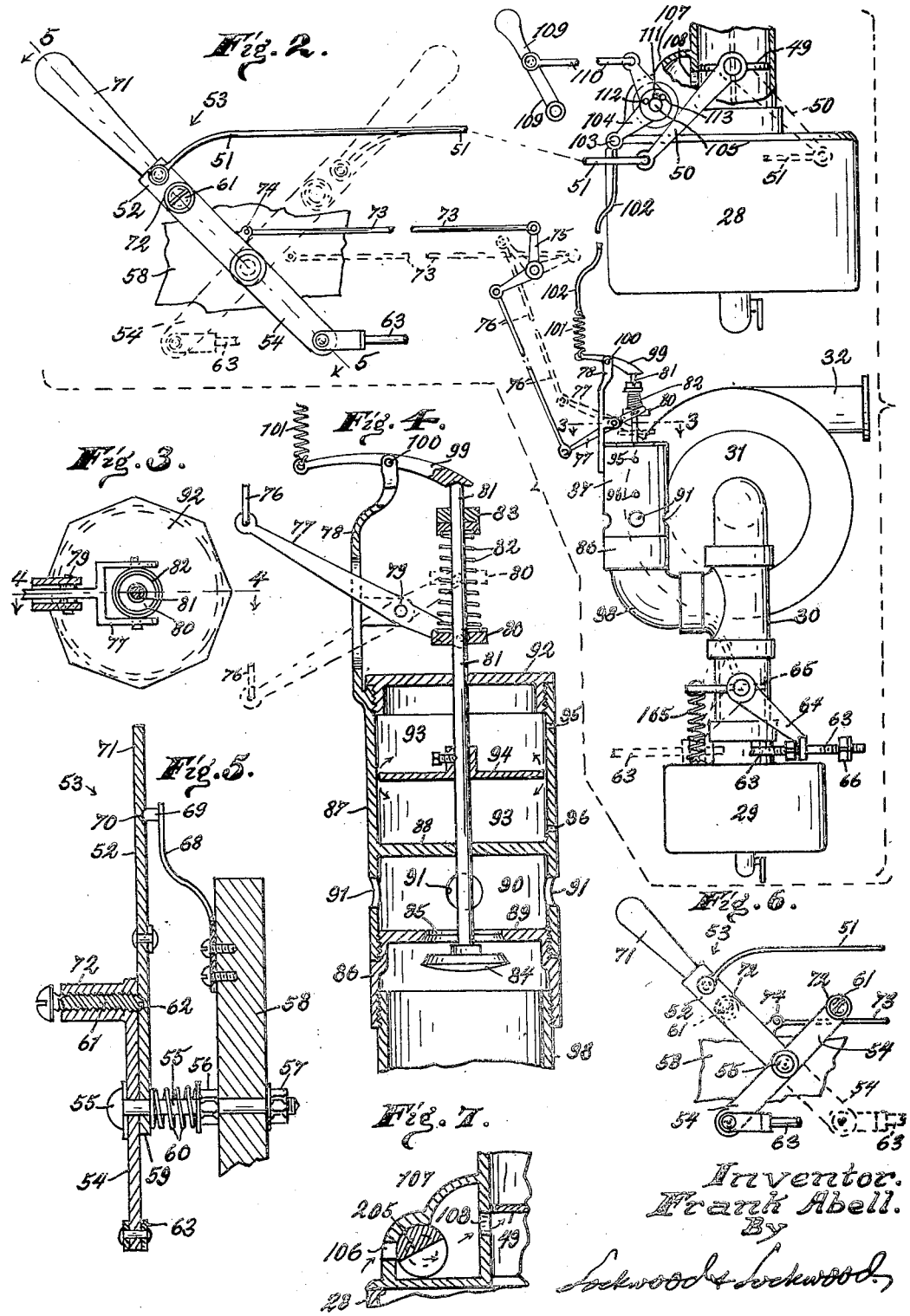

1,907,470

UNITED STATES PATENT OFFICE

FRANK ABELL, OF INGLEWOOD, CALIFORNIA

INTERNAL COMBUSTION ENGINE

Application filed April 4, 1931. Serial No. 527,693.

This invention relates to internal combustion engines, and the principal object is to increase the horse-power of such engines without a corresponding increase of the consumption of fuel, speed and weight. To that end I slightly enlarge the upper ends of the cylinder chambers and provide means for supercharging them with charges of mixture relatively lean in fuel that are injected into the cylinders below the richer charges of mixture that are taken into the cylinders in the usual way so that under compression the richer mixtures are compressed in strata around the spark plugs with the leaner charges of mixture in strata below them, which, when ignited, develop a power greatly in excess of the usual horsepower developed by an ordinary engine.

Another object of the invention is to supply a simple means for supplying charges of mixture to the engine cylinders in a zoning manner, and with the mixture charges varied as to their combustible quality as best adapted for efficiently and economically operating the engine over as wide a range of operating conditions as possible.

To that end I provide a main carburetor through which charges of mixture of a highly combustible nature are taken into the engine cylinders in the usual way to partially charge them, and I also provide an auxiliary carburetor from which charges of mixture of a less combustible nature are injected into lower zones of the cylinders to finish charging them, so that when compressed the charges of mixture will be stratified with the richer charges around the spark plugs, as previously stated, and the leaner charges interposed between the hot ends of the pistons and the rich mixture charges so that pre-ignition is practically avoided.

A feature of the invention is shown in the control of the charges of fuel mixture from both the main and auxiliary carbureters whereby the throttle valves can be opened and closed together, or independently of one another, to operate the engine efficiently and economically.

Features of invention are shown in the construction, combination and arrangement of parts to control the detonating of the portion of the charge that burns last, also to supply the anti-knock mixture to the engine cylinder so that compression therein is increased over standard compression in proportion to the amount of anti-knock mixture supplied, with means for varying the amount and quality of the mixture.

Other objects, advantages and features of invention may appear from the accompanying drawings, the subjoined detailed description and the appended claims.

The accompanying drawings illustrate the invention.

Fig. 2 is a fragmental diagrammatic side view of the carbureters and injector with the engine omitted showing the connections between the throttle valves and air valves with the throttle control levers.

Fig. 3 is an enlarged cross section on the line 3—3, Fig. 2, showing a plan view of the auxiliary air valve housing, and also showing the means for mounting the spring that aids in controlling the opening and closing of the auxiliary air valve.

Fig. 4 is a central vertical section through the auxiliary air valve housing showing the valve open.

Fig. 5 is an enlarged section on the line 5—5 of Fig. 2, showing the detailed construction of the compound throttle lever.

Fig. 6 is a view analogous to Fig. 2, showing an altered position of the auxiliary lever, the main lever being held in the same position it occupies in Fig. 2.

Fig. 7 is a fragmental section through the air valve of the main carbureter.

Figure 1:
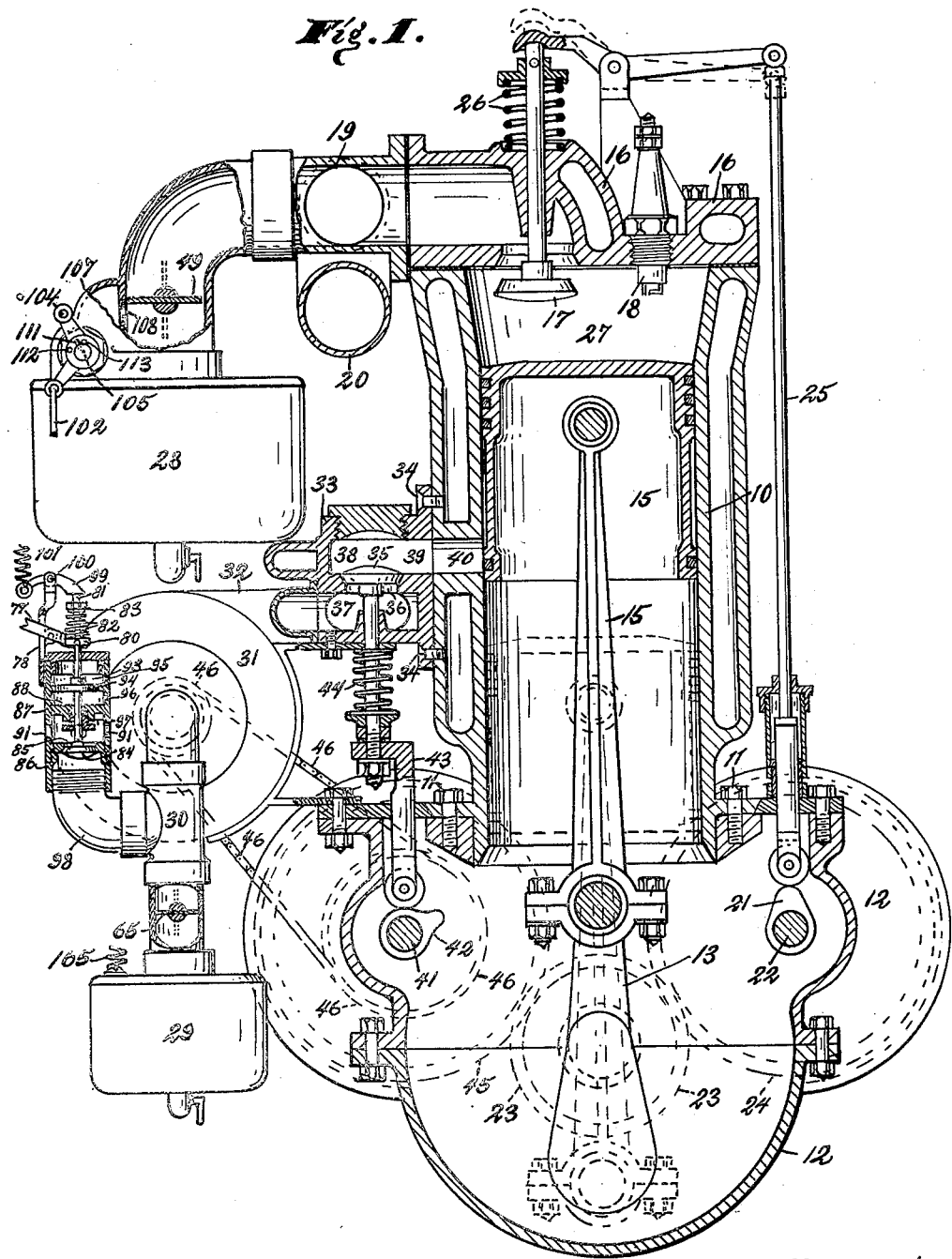
Figure 1 is a central vertical cross section through an internal combustion engine constructed in accordance with this invention, with the carbureters and injector shown semi-diagrammatically, and omitting the connections between the throttle valves and throttle control levers also not shown.

The engine shown in Fig. 1 is cut in a vertical cross section so that only one of its four cylinders is shown and also the section is cut so that the exhaust valve is omitted.

It is understood that the cylinders are alike and operated in the usual way so that a description of one cylinder will describe all of them.

The cylinder 10 is secured by bolts 11 on the top member of a split crank housing 12 in which a crank shaft 13 is mounted. This shaft is connected by a piston rod 14 to a piston 15 and the upper end of the cylinder is closed by the head 16 in which there is the usual inlet valve 17, spark plug 18 and an exhaust valve not shown. The inlet and exhaust valves are connected to the inlet and exhaust manifolds 19 and 20 and are operated in proper time with the piston.

These valves are opened by cams 21 on cam shaft 22 that is driven in the usual way, as by gears 23, 24 shown in dotted lines in Fig. 1. The cams 21 lift the rods 25 to move the valves to open position against the tension of the springs 26 that close the valves in proper time with the movement of the piston 15.

All of the foregoing parts are old in the art and form only indirectly a part of this invention.

The cylinder 10 is enlarged above the upper limit of the piston stroke to form a combustion chamber 27. This cylinder is enlarged by tapering its wall upward and outwardly so it is in the form of a blunt funnel with its upper end portion surrounding the spark plug and valves.

All of the cylinders are so constructed and the purpose of these enlarged combustion chambers is to provide a space for the extra charges of fuel mixture that are injected into them after they have first been partly charged in the usual way, as by suction of the pistons.

A main carbureter 28 is connected to the inlet manifold 19 to supply partial charges of fuel mixture to the engine cylinders in zones around their spark plugs and their charges are taken into the cylinders in the usual way, as by suction caused by the pistons moving on their intake strokes; and preferably the fuel mixture supplied by the main carbureter is of highly combustible quality so it will readily ignite when compressed around the spark plugs and the latter actuated.

After these partial charges of fuel mixture are taken in, the cylinders are completely charged by additional charges of mixture from the auxiliary carbureter 29 that preferably supplies fuel mixture to the cylinders that is considerably less combustible than that supplied by the main carbureter.

The auxiliary carbureter 29 is connected by a T-pipe 30 to a blower 31 that is connected by a pipe 32 to an auxiliary inlet manifold 33 secured to the cylinders 10 by screws 34. Secondary inlet valves 35 control passages 36 from the manifold chamber 37 to upper chambers 38 that are connected by passages 39 with inlet ports 40 extending through the walls of the cylinders 10.

The engine cylinders, as well as the auxiliary manifold, are water jacketed, as shown in Fig. 1, for purposes well known in the art.

The passages 40 are arranged about one-third the distance above the pistons 15 when they are at their lower dead center of travel so the ports are open for a considerable time during the intake and compression strokes thereof or a sufficient time to fully supercharge the cylinders through the ports 40.

The valves 35 are opened in time with the intake stroke of the piston by means of the cam shaft 41, cams 42, push rods 43; and they are closed by the springs 44. The cam shaft is driven by the gears 23 and 45, or in the usual way.

Preferably the cams 21 and 42 are set on their respective shafts so that the main intake valves 17 open slightly in advance of the auxiliary valves 35 and also the cams 42 are formed so that the valves 35 close slightly in advance of the valve 17.

The blower 31 is driven from cam shaft 41 by a sprocket and chain drive 46 semi-diagrammatically indicated by full and dotted lines in Fig. 1. The blower 31 is driven to draw charges of fuel mixture from the carbureter 29 and inject them into the engine cylinders 11 through the ports 40 whenever the valves 35 are open. In other words the blower charges the chamber 37 of the manifold 33 and maintains the mixture under pressure so that the mixture will automatically enter the cylinders when the valves 35 are open.

The carbureter 28 is provided with the usual butter-fly throttle valve 49 having a lever 50 connected by a rod 51 with the member 52 of the compound throttle lever 53. The detailed construction of lever 53 is shown in Figs. 2, 3, 5 and 6; and as best shown in Fig. 5 it consists of the two members 52 and 54, both of which are pivotally mounted on the pivot bolt 55 secured by opposing nuts 56, 57 to a support 58 that can be the side wall of a car or dash-board thereof.

Interposed between the hub 59 of member 52 and the nut 56 is a spring 60 that yieldingly holds the members engaged, the set screw 61 of member 54 extending in a recess 62 in member 52 so that normally the members move together.

The lower end of the member 54 is connected by a rod 63 with the lever 64 that controls a throttle valve 65 in the auxiliary carbureter 29 so that when the compound lever 53 is moved to open the valve 49 it will also move the rod 63 to open the valve 65.

The rod 63 is connected to the lever 64 so that the throttle valve 49 is opened sometime in advance of the throttle valve 65. In other words, the rod 63 slides through the outer end of the lever 64 until engaged by the nut 66, after which the valve 65 begins to open with the valve 49. On the closing movement of the valve 65 an oppositely arranged nut 67 and spring 165 cause the valve to close in a reverse order to its opening movement.

By means of the pivotal yielding connection 55, 60 between the members 52, 54 either can be moved independently of the other. That is, by moving the member 52 sidewise against the tension of the spring 60 and stop spring 68 to disengage the member 52 from the set screw 61, it can be moved in either direction independently of the member 54 to open and close the valve 49 and the same is true of the member 54.

The stop spring 68 has a detent 69 arranged to extend into a recess 70 in the member 52 to hold it against movement when the member 52 is to be moved alone. For convenience the member 52 has a handle 71 by which it can be moved and also the member 54 has a handle 72 through which the set screw 61 is adjustably extended.

A rod 73 has one of its ends pivotally connected by a pin 74 to the member 52, and its other end is connected to one arm of a bell crank 75 which, through a rod 76, has its other arm pivotally connected to the outer end of a lever 77, that is extended through a slot in the post 78 and pivoted at 79 so that its forked end supports a spring seat 80 slidable on the valve stem 81.

A spring 82 is arranged between the seat 80 and a nut 83 on the upper end of the valve stem 81, and the nut is adjustable so that the tension of the spring can be altered as may be required to hold the air valve 84 engaged with the seat 85 in the upper end of the cylindrical plug 86 that supports the air valve housing 87.

The cylindrical housing 87 has an intermediate cross wall 88 through which the valve stem 81 is slidably extended and this wall is spaced above the top end 89 of the plug 86 to form a chamber 90 into which air is admitted through the ports 91.

Also the top end of the cylindrical housing 87 has a plug 92 in its upper end through which the stem 81 is slidable. Between the wall 88 and plug 92 there is another air chamber 93 in which a dash pot piston 94 is arranged and secured to the stem 81.

Air ports 95 and 96 are extended through the wall of the housing 87 that are arranged above and below the piston 94 so that when the valve 84 is either opened or closed there will be a slight air resistance to the piston 94 to prevent an abrupt movement of the valve 84. It is understood that I may use either air or oil to control the movement of this piston, and when oil is used I provide a packing 97 around the stem 81, as shown in Fig. 1. This packing is not necessary when air is used, as illustrated in Fig. 4.

The lower end of the plug 86 is connected by a pipe joint 98 with the T pipe 30 that connects the auxiliary carbureter 29 to the blower 31 so that when the blower is operated and the valve 65 is closed, or partly closed, suction on the valve 84 will open it more or less to admit unmixed air to the engine cylinders.

The amount that the valve 84 is opened by suction depends first on the opening and closing position of the throttle valve 65 and secondly on the amount of tension that is applied to the spring 82 by either the position of the nut 83 or lever 77.

It will be observed that either of these parts can be adjusted to increase or decrease the tension on the spring 82. It will require less suction to open the valve 84 as the tension on the spring decreases and vice versa.

The valve 84 is opened automatically by suction from the injector 31 and is closed by the spring 82 when its tension is sufficient to overcome the force of suction. However, I also provide a manually operated means for opening the valve 84. This means includes a lever 99 pivotally mounted on a pin 100 in the top of the post 78 with its free end engaging the upper end of the valve stem 81 so that when the lever has its other end drawn upward, the valve 84 will be opened.

The other end of the lever 99 yieldingly is connected by a spring 101 with the lower end of a draw bar 102 that has its upper end connected by a pin 103 to one arm of a bell crank 104 that is loosely mounted on a shaft 105 that has a valve 205 arranged to open a port 106 in the housing 107 to admit air through the port 108 in rear of the throttle valve 49 for a purpose well known in the art. The bell crank is actuated by a lever 109 and connecting rod 110, as shown diagrammatically in Fig. 2.

The bell crank 104 is arranged to move the rod 102 slightly in advance of rotating the valve shaft 105 so that the valve 84 will be opened slightly in advance of the port 106 to reduce the richness of the mixture in the manifold 37 in advance of that in manifold 19.

This movement is accomplished by loosely mounting the bell crank 104 on the shaft 105 and providing the shaft with a pin 111 arranged between the spaced pins 112 and 113 so that when the crank is moved to open the port 106 the pin 112 will engage the pin 111 and turn the shaft; and in a reverse movement the pin 113 will return the valve shaft to a closed position.

It is obvious that in throttling the engine the compound lever 53 can be actuated independently of the lever 109 and also that the members 52 and 54 of lever 53 can be actuated independently of one another so that the engine can be throttled through a wide range of operation.

In operation the compound lever 53 is moved from the full line toward the dotted line as much as is required to start the engine, and then on to as wide a throttle as is necessary, in which movement the throttle valve 49 is first open and the tension on spring 82 slightly released so that the valve 84 can be more readily opened by suction; after which the throttle valve 65 is opened. In other words the rod 63 is connected to the throttle lever 64 so that valve 65 is opened sometime after the valve 49.

The compound lever 53 is constructed so that it can open both throttle valves as stated or its member 52 and 54 manipulated independent of the other. In other words, when the lever member 54 is held stationary while part 52 is moved toward open throttle only the valve 49 will be opened so that only mixture from the main carbureter will enter the cylinders, with pure air passing the valve 84 by suction to super-charge or finish charging the cylinder in strata in the lower part of the cylinders as described. If the member 54 is now moved toward open throttle charges of mixture from the auxiliary carbureter will also enter the cylinders as described.

If also the lever 109 is now actuated to open port 106 and valve 84 it is obvious that the mixture charges from both carbureters will be greatly reduced as to fuel values. In other words the richness of the mixtures will be reduced proportionately to the opening of the port 106 and valve 84.

From the foregoing it can be readily seen that by a proper manipulation of levers 53 and 109 proper charges of mixture can be supplied to the cylinders to operate the engine economically and efficiently and to also eliminate the objectionable feature of knocking and greatly aid in increasing the horsepower.

I claim as my invention:

1. In combination with an internal combustion engine having cylinders with enlarged combustion chambers therein, and means including a main carbureter for partially charging them with fuel mixture, of an auxiliary carbureter, a blower interposed between said carbureter and the engine cylinders and in communication therewith, an air valve housing interposed between said carbureter and blower having air ports therethrough, and an air valve in said housing adapted to admit air unmixed with fuel to said blower.

2. The combination set forth in claim 1, with automatic means for closing said valve after it is opened by suction of said injector.

3. The combination set forth in claim 1, with a spring for closing said valve, and a dash-pot for retarding the movement of said valve toward an open or closed position.

4. The combination set forth in claim 1, with a spring for closing said valve, and a manually operated lever for increasing or decreasing the tension on said spring.

5. The combination set forth in claim 1, with a throttle lever, a spring for closing said valve, another lever having one end supporting said spring, and a connection between said levers, whereby the tension on said valve is increased or decreased by the actuation of said throttle lever for the purpose specified.

6. The combination set forth in claim 1, with a throttle valve in said main carbureter, another throttle valve in said auxiliary carbureter, a compound lever for moving both of said valves, a spring on said air valve, a forked lever for supporting said spring, a connection between said forked lever and said compound lever whereby the tension on said spring is increased or decreased when the main throttle valve is opened or closed, and other means connected with the main carbureter for opening said air valve.

7. An internal combustion engine and apparatus for charging it, including cylinders having spark plugs therein, a main carbureter adapted to supply charges of fuel mixture to said cylinders in zones around said spark plugs, an auxiliary carbureter for supplying charges of fuel mixture to said cylinders in zones below the charges supplied by said main carbureter, manual means for increasing or decreasing the richness of the mixture as required for efficiently operating the engine, an air valve interposed between said auxiliary carbureter and engine, and a lever supported spring for regulating the opening and closing of said valve.

8. In combination with an internal combustion engine having cylinders with enlarged combustion chambers in their upper ends, an inlet manifold connected to the upper ends of said cylinders, a main carbureter for supplying fuel mixture to said manifold to partly charge the chambers in said cylinders, a throttle valve, and a compound throttle lever for controlling said valve, of an auxiliary inlet manifold connected to said cylinders adjacent their lower ends, an auxiliary carbureter for supplying a fuel mixture to said auxiliary manifold, a throttle valve in said auxiliary carbureter, a lever for said valve and a connection between said throttle valve levers whereby the movement of said compound lever will also actuate the throttle lever of said auxiliary carbureter.

9. In combination with an internal combustion engine having cylinders with fuel inlet passages at the upper ends of their combustion chambers and fuel inlet ports adjacent the other ends thereof, a main carbureter for supplying fuel to the passages in the upper end of said cylinders, an auxiliary carbureter for supplying fuel to said inlet ports, a throttle valve for each carbureter, a throttle lever for each valve, a compound throttle lever for actuating said throttle levers, and a slip connection between the throttle lever of said auxiliary carbureter and said compound throttle lever, whereby the throttle valve of the main carbureter is opened in advance of the throttle valve of said auxiliary carbureter.

In witness whereof, I have hereunto affixed my signature.

FRANK ABELL.